No. 878,125.
PATENTED FEB. 4, 1908.
I. DE KAISER.
REEL FOR COIL WINDINGS.
APPLICATION FILED MAR. 3, 1906.
2 SHEETS—SHEET 1.
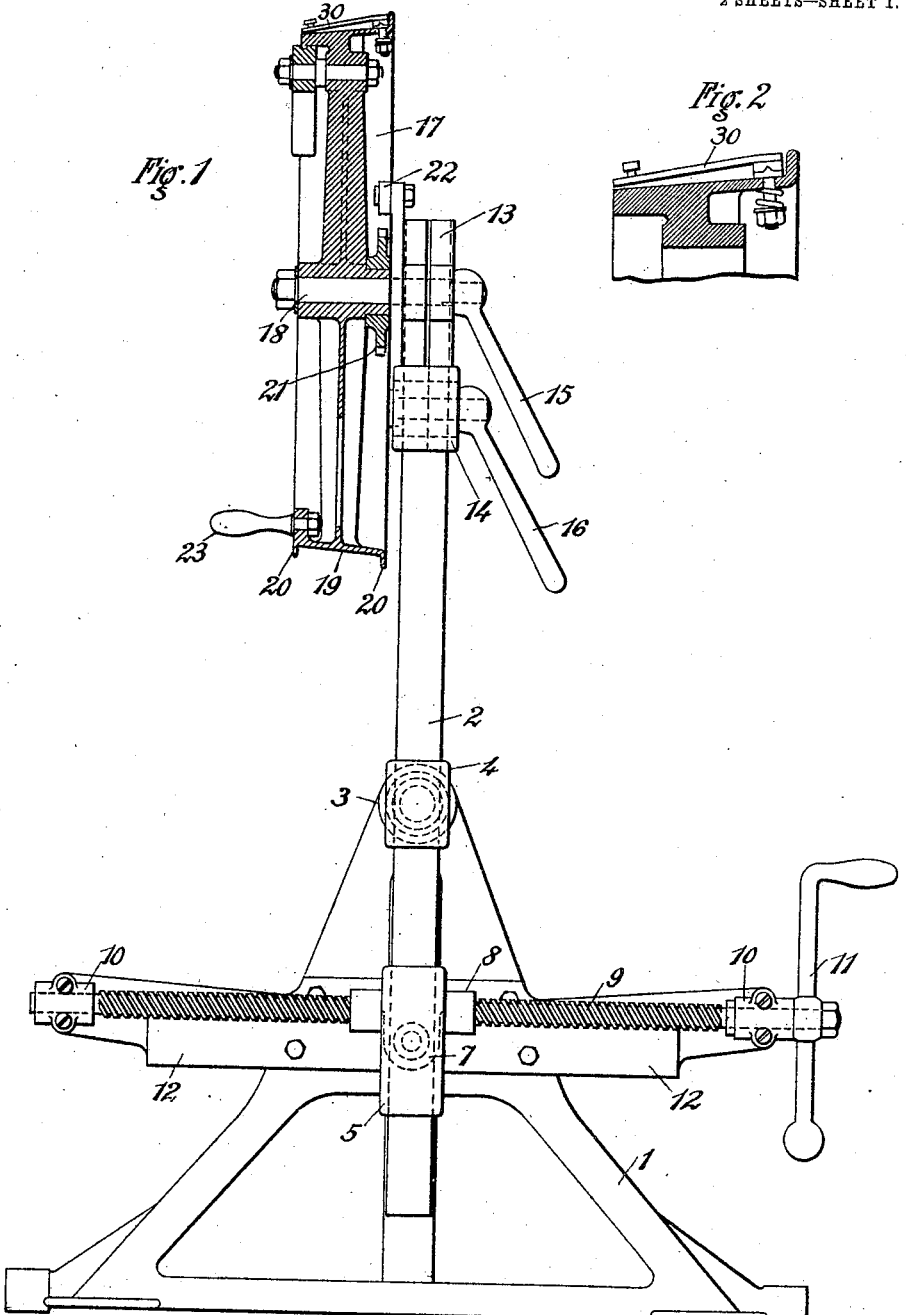

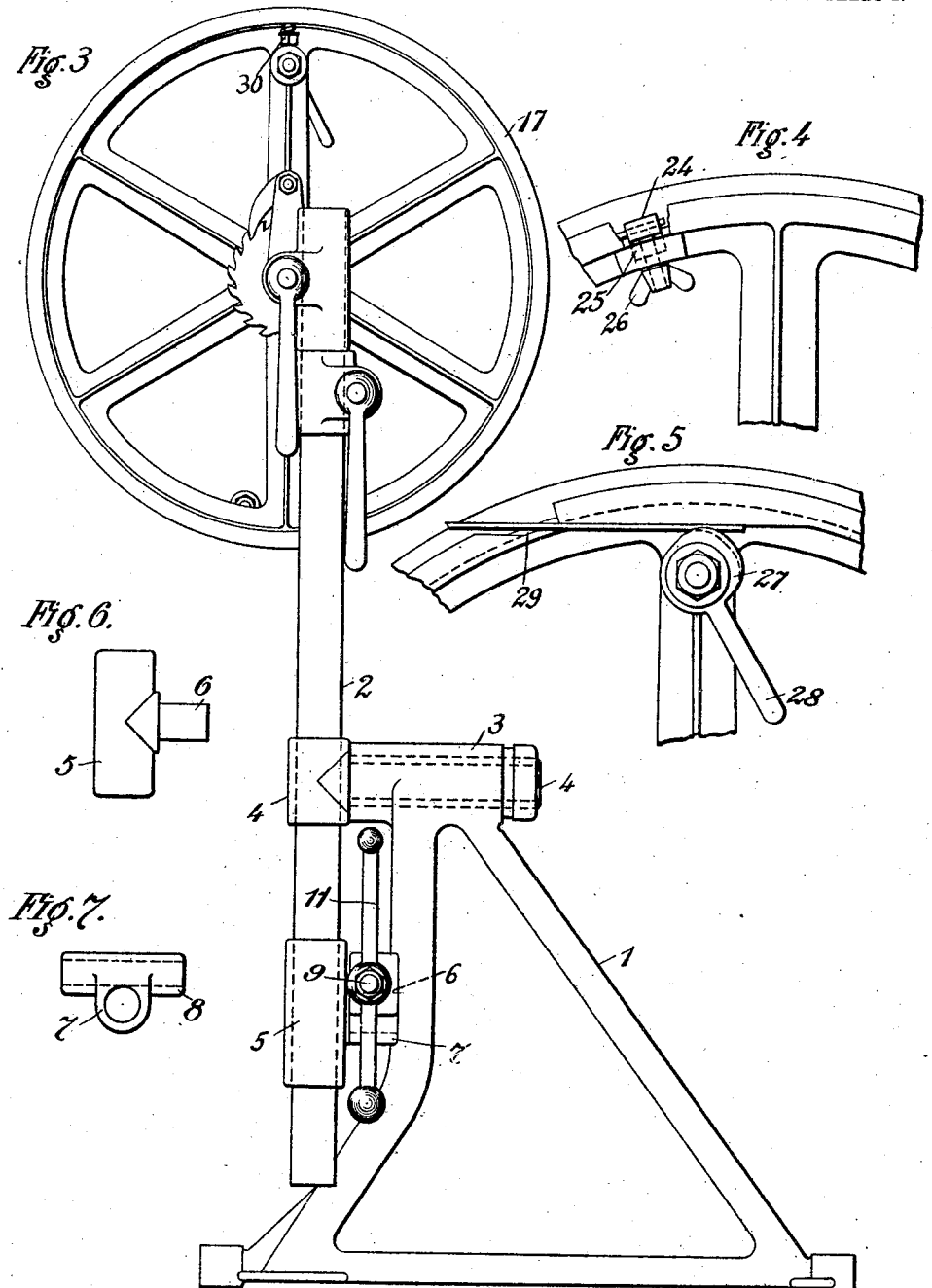

UNITED STATES PATENT OFFICE.

ISAAC DE KAISER, OF WILKINSBURG, PENNSYLVANIA, ASSIGNOR TO WESTINGHOUSE ELECTRIC & MANUFACTURING COMPANY, A CORPORATION OF PENNSYLVANIA.

REEL FOR COIL-WINDINGS.

No. 878,125.    Specification of Letters Patent.    Patented Feb. 4, 1908.

Application filed March 3, 1906. Serial No. 304,134.

*To all whom it may concern:*

Be it known that I, ISAAC DE KAISER, a citizen of the United States, and a resident of Wilkinsburg, in the county of Allegheny and State of Pennsylvania, have invented a new and useful Improvement in Reels for Coil-Windings, of which the following is a specification.

My invention relates to reels or similar devices and has special reference to reels which are adapted for use during the process of winding such coils for dynamo-electric machines as are formed by threading the conductors back and forth through suitable slots in the magnetizable core members.

The object of my invention is to provide a device of the class above indicated, that shall be simple and durable in construction and that shall materially facilitate the formation of coils in the core slots of dynamo-electric machines.

It has often been found desirable, particularly in the winding of dynamo-electric machines which are designed for relatively high voltages, to employ substantially closed core slots and to form the coils by threading the conductors of which they are composed back and forth through the proper slots. Windings formed in this way, are preferable to those formed by forcing previously formed coils into the slots from one end, since such coils require a large number of joints or connections in the conductors in order to connect the proper turns of the winding together. Coils of the threaded construction, which are commonly known as hand-wound coils, have heretofore involved the use of a relatively large amount of space, since the conductors which were pulled through the slots by hand were usually of considerable length. Furthermore, the conductors were continually being drawn along the floor, in the hand winding process, and considerable difficulty was therefore experienced in the use of machines so wound by reason of the rapid deterioration of the conductor insulation which was largely due to the worn condition of the insulation and the impregnation of its fiber with dirt.

According to my present invention, I provide a reel upon which the conductor may be coiled, and from which it may be readily removed without injury, so that the winding process is materially facilitated and the conductor insulation is kept relatively clean.

My invention is illustrated in the accompanying drawings in which

Figure 1 is a view, partially in elevation and partially in section, of a device constructed in accordance therewith and Fig. 2 is a cross-section through the pulley rim on a larger scale. Fig. 3 is a side elevation of the machine shown in Fig. 1 and Figs. 4 and 5 are detail views of suitable clamping devices which may be employed in the machine illustrated in Figs. 1 and 3. Figs. 6 and 7 are detail views of the parts by which an angular adjustment of the device is effected.

Referring to the drawings, the reel comprises a pedestal or base 1 which may assume the form of a tripod and which is preferably made relatively heavy so that the reel may not easily be overturned. A rod or bar 2 is pivotally supported in a horizontal bearing 3 at the top of the pedestal 1 by means of a swivel 4 in the form of T-pipe connection, one portion of which surrounds the rod 2 and is rigidly attached thereto. The rod 2 may be held in either a vertical or an inclined position by means of a guide bearing 5 which is similar to the swivel 4 except that the sleeve portion which surrounds the rod 2 is fitted loosely thereon in order to allow the rod to slide through it. A horizontal projection 6 of the bearing 5 is engaged by a sleeve projection 7 which is integral with a traveling nut 8 and perpendicular to its axis. The guide bearing 5 and the traveling nut 8 are both supported by a horizontal, screw-threaded shaft 9 that is mounted in a pair of similar bearings 10 and may be rotated by a crank handle 11. The bearings 10 are separated by a considerable distance and are supported by projecting arms 12 which are attached to the base or pedestal 1. With this arrangement, the angle between the bar 2 and the vertical may be varied by turning the crank handle 11 which causes the nut 8 to travel backward or forward along the screw-threaded shaft 9, the bearing 5 being arranged to automatically adjust itself to the position occupied by the rod 2.

A pair of split bushings 13 and 14 may be clamped to the upper portion of the rod 2 by means of handle clamps 15 and 16 in order to support a pulley 17 in any desired position. The vertical position of the pulley 17 on the rod 2 may be determined by fixing the split bushing 14 by means of the clamp 16.

The bushing 13 rests upon the bushing 14 so that the pulley is free to revolve around the rod when the clamp 15 is loose or it may be held at any convenient angle by setting this clamp. The pulley itself is rotatably mounted upon a horizontal shaft 18 which is attached to and supported by the bushing 13.

The outer surface 19 of the pulley 17 is conical and is provided with annular flanges 20 which serve to keep the wire or similar conductor in place. A ratchet wheel 21 is rigidly fixed to the hub of the pulley and may be engaged by a pawl 22 which is supported from the shaft 18. A handle 23 that is attached to the pulley near its circumference, may be employed for rotating it while drawing the conductor through the core slot and winding it about the pulley surface, the ratchet and pawl being employed for preventing the backward turning of the pulley by reason of the strain exerted upon the conductor.

As the end of a conductor is first pulled through a core slot, it is clamped to the surface 19 of the pulley by any convenient means, such, for example, as that illustrated in Fig. 4, or that illustrated in Fig. 5. The clamp illustrated in Fig. 4 comprises a bolt 24 the head of which is fitted into a suitable recess 25 in the rim of the pulley, and the screw-threaded portion of which extends through a hole in the rim and is engaged by a thumb nut 26. The head of the bolt is drilled to receive a conductor in a line substantially tangent to the rim surface. When the end of the conductor is inserted in this hole the thumb nut is tightened to clamp the conductor against the surface of the pulley.

The clamping device illustrated in Fig. 5 accomplishes the same result and comprises an eccentric cam 27 having a handle lever 28 to clamp the conductor against a plane surface which is provided on the inside of the rim, a suitable opening 29 being provided in the rim through which the end of the conductor may be thrust to be engaged by the clamp.

The pulley 17 is so adjusted vertically that its highest point is on substantially the same level as the core slot from which the conductor is received and it is then revolved on the rod 2 until the center line of the core slot is substantially tangent to its outer surface in a plane perpendicular to the pulley axis. When the reel is properly adjusted in the aforesaid manner and the end of the conductor is clamped to the pulley, the latter is rotated by means of the handle 23 until the total length of free conductor is wound upon its surface. The conductor is held in place on the pulley by means of a plurality of guides 30 which are tangent to the surface of the pulley and near one side while the conductor is being coiled but which may be swung through an angle of 90° to extend across the surface of the pulley after the conductor has all been wound thereon. The end of the conductor is released from the clamp after the conductor has all been coiled and is threaded back through another predetermined slot to be received, at the other side of the machine, by another similar reel which is properly adjusted for the slot from which the conductor issues, and the guides 30 serve to keep the coiled conductor from kinking or loosening back as the conductor is taken off. The conductor may be more readily removed from the pulley surface if the pulley is revolved upon the rod 2 through an angle of substantially 90° so that the conductor is perpendicular to its plane of rotation.

Variations in the size, form and arrangement of details may, of course, be made without departing from the spirit of my invention and I desire that such changes shall be included within its scope.

I claim as my invention:

1. In a reel for winding coils in the slots of dynamo-electric machines, the combination with a base or pedestal, of a rod or bar supported thereon, a substantially horizontal shaft adjustably attached to the upper end of the rod, a pulley rotatably mounted upon said shaft, and means for adjusting the angular position of the rod.

2. In a reel for winding coils in the slots of dynamo-electric machines, the combination with a base or pedestal, and a rod or bar supported thereon, of a substantially horizontal shaft adjustably attached to the upper end of the rod, a pulley rotatably mounted upon said shaft, and means for adjusting the angular position of the rod, said means comprising a substantially horizontal screw-threaded shaft, a traveling nut mounted on said shaft, and a guide-bearing that engages the lower end of said rod and said clamping nut.

3. The combination with a base or pedestal, of a substantially upright rod or bar pivotally mounted near its middle point upon said base, means for adjusting the angular position of said rod, a shaft attached to the upper end of the rod with its axis perpendicular thereto, a pulley rotatably mounted on said shaft, and means for vertically and rotatably adjusting the position of said shaft relative to the rod.

4. The combination with a base or pedestal, of a substantially upright rod or bar pivotally mounted near its middle point upon said base, means for adjusting the angular position of said rod, a shaft attached to the upper end of the rod with its axis perpendicular thereto, a pulley having a relatively wide and conical rim surface and having annular flanges at the edges of the rim, and means for vertically and rotatably adjusting the position of said shaft relative to the rod.

5. In a reel for facilitating the hand winding of coils for dynamo-electric machines, the combination with a base and a normally upright but angularly adjustable rod supported thereon, of a shaft mounted upon said rod near its upper end, a pulley on said shaft, and means for clamping a conductor to the surface of the pulley.

6. In a reel for facilitating the hand winding of coils for dynamo-electric machines, the combination with a base and a normally upright but angularly adjustable rod supported thereon, of a shaft mounted upon said rod near its upper end, a pulley on said shaft, and means for clamping a conductor to the surface of the pulley, said means comprising a bolt which engages a radial opening in the rim of the pulley, a recess in the outer surface of the rim into which the head of the bolt is fitted, and a hole in the head of the bolt to receive one end of the conductor.

7. The combination with a pedestal and a normally upright rod movably mounted thereon, of means for adjusting said rod in a vertical plane about its point of support and a pulley mounted upon said rod and vertically adjustable thereon.

8. The combination with a pedestal and a normally upright rod movably mounted thereon, of means for adjusting said rod in a vertical plane about its point of support and a pulley adjustably mounted on said rod and provided with means for clamping a wire to its surface.

9. The combination with a base or pedestal and a normally upright but angularly adjustable rod supported thereon, of a pulley mounted upon the upper end of the rod and adjustable both lengthwise and circumferentially of the rod, and means for clamping the pulley shaft in any position to which it may be adjusted.

10. The combination with a base or pedestal and a normally upright but angularly adjustable rod supported thereon, of a shaft adjustably mounted upon the rod near its upper end, a pulley on said shaft, means for clamping the shaft in any position to which it may be adjusted around the rod, and means for supporting it in its adjusted position lengthwise of the rod.

In testimony whereof, I have hereunto subscribed my name this 28th day of February, 1906.

ISAAC DE KAISER.

Witnesses:
RICHARD WAHLE,
BIRNEY HINES.